C. W. BREWSTER.
AUTOMATIC TRAIN STOP.
APPLICATION FILED JAN. 13, 1914.

1,258,650.

Patented Mar. 12, 1918.
5 SHEETS—SHEET 1.

WITNESSES:
W. C. Rodriguez
V. H. Smith

INVENTOR
Charles W. Brewster
BY
Edward Barnhard
ATTORNEYS

C. W. BREWSTER.
AUTOMATIC TRAIN STOP.
APPLICATION FILED JAN. 13, 1914.

1,258,650.

Patented Mar. 12, 1918.
5 SHEETS—SHEET 3.

WITNESSES:

INVENTOR
Charles W. Brewster
BY
Edson Bernhard
ATTORNEYS

C. W. BREWSTER.
AUTOMATIC TRAIN STOP.
APPLICATION FILED JAN. 13, 1914.

1,258,650.

Patented Mar. 12, 1918.
5 SHEETS—SHEET 4.

WITNESSES:

INVENTOR
Charles W. Brewster
BY
Edw. Bernhard
ATTORNEYS.

UNITED STATES PATENT OFFICE.

CHARLES W. BREWSTER, OF NEW YORK, N. Y., ASSIGNOR OF ONE-HALF TO JAMES MERRITT LEACH, OF NEW YORK, N. Y.

AUTOMATIC TRAIN-STOP.

1,258,650.  Specification of Letters Patent.  Patented Mar. 12, 1918.

Application filed January 13, 1914. Serial No. 811,792.

*To all whom it may concern:*

Be it known that I, CHARLES W. BREWSTER, a citizen of the United States, residing at the city of New York, borough of Manhattan, county and State of New York, have invented a certain new and useful Automatic Train-Stop, of which the following is a specification.

This invention is a train stop for use on railways in connection with signaling means or by the occupancy of a preceding block by a train, or both.

Among the objects of the invention are to automatically apply the brakes so as to bring to a stop a moving vehicle when a block ahead of it is occupied or should said vehicle run past a signal displayed at danger; to automatically shut off the power and in like manner to actuate a cab signal of either a visual or audible nature in order to attract the attention of the engine driver; to automatically discharge a predetermined quantity of sand as an aid to the brakes in stopping the vehicle; and to require the engine driver to manually reset the motor controlled mechanism in such a way as to establish a record of the number of times the train is automatically stopped or that it runs past the danger signal.

These various objects, and others inherent in this invention, provide means operable independently of the efforts of the engine driver and beyond his control or manipulation for automatically stopping the moving vehicle should it run into a danger zone, so that the liability of collision or accident is avoided, or at least minimized, in the event of death or disability of the engine driver; but should the vehicle, through carelessness or inattention of the driver, run past a signal or beyond the safety point, then a record is established which demands an explanation from the driver so that a definite indication is afforded in fixing the responsibility should an accident result from preventable causes.

A salient feature of the invention is a prime mover, of one form or another, but preferably electrically operated, the same being electrically controlled from or by a moving vehicle or from or by a semaphore, for operating in a positive manner the various mechanisms by which the train line of the brake system on the vehicle is vented so as to apply the brake shoes, to shut off the power, to discharge the sand, and to actuate a cab signal, any two or more or all of these instrumentalities being employed as desired.

The prime mover in a practical embodiment of the invention is an electric motor adapted to be supplied with current from a suitable source, such as a storage battery on the vehicle. This motor is combined with a system of levers, the latter operating valves which control the flow of air through pipes so as to vent the train line of the brakes, to operate a whistle, to start the flow of sand, and to shut off the power, all these operations, or any two or more of them, being performed automatically and independently of the efforts of the engine driver.

The motor circuit is normally open but it is adapted to be closed automatically by a magnet in a circuit which includes, first, a control station rail adjacent to a track; second, the track rails, one of which is divided into sections, the latter being insulated; and, third, a semaphore which when moved to a danger position operates to move a switch into position for closing the space between switch contacts from which lead conductors that are connected respectively to the control station rail and to the non-insulated track rail, whereby the contact of a shoe carried on the moving vehicle with the control station rail operates to close the track circuit in a manner to energize the magnet so as to attract its armature for closing the motor circuit.

Other features and advantages of the invention will appear from the following detailed description.

In Figs. 1 to 4, inclusive, of the drawings I have illustrated the train stop mechanism in connection with an ordinary steam locomotive X, the equipment including a valve A on a train pipe 10 forming a part of the brake system. This valve A may be of any preferred construction, but in Figs. 2 and 3 it is shown as a rotary valve normally occupying a position wherein its port $a$ is transverse to the pipe 10 for the purpose of closing a vent or outlet 11, but when the valve is turned to an open position the air flows out of the train line 10 and into the branch pipe 11 so as to conduct the outflowing air into an audible signal A', the same being shown as a whistle, whereby the automatic operation of valve A by the brake mechanism, of which said valve A forms a part, will automatically bring into service the audible signal so as to give notice of the application of the brakes. This valve A is associated with a lever B, the same being provided with a handle $b$ and to this lever is pivoted, by a pin $c$, a link C, the other end of which is provided with a longitudinal slot $c'$, within which is positioned a wrist pin $d$ on an operating member D, the latter being herein shown as a gear which is mounted on a shaft $d'$. This gear meshes with a gear $e$ on the armature shaft $e^4$ of an electric motor E, the latter constituting the prime mover in the train stop mechanism illustrated in said figures of the drawings. The motor is provided as usual with binding posts $e'$ $e^2$, to the former of which is attached a conductor 12 having a branch connection 13 with a stationary member 14 of a breaker switch, the movable member of which is indicated at 15. This breaker switch is provided with an electrical insulation 16, and said switch is mechanically controlled by a spring 17 which operates to pull the breaker switch into contact electrically with member 14, whereby the insulated end portion 16 of the breaker switch 15 is normally in the path of a stud 18 on the rotary member D, whereby the rotation of said member 18 in the direction indicated by the arrow will operate to bring the stud 18 into contact with the insulated end 16 of the breaker switch so as to move the latter out of engagement with member 14 and into the position indicated by dotted lines in Fig. 2, thus interrupting the circuit of motor E.

20 designates a pipe leading to mechanism for shutting off the power, and 21 another pipe extending upwardly to a sand drum F, said pipes 20 21 being controlled by valves G G', respectively, for the purpose of automatically supplying the air required to operate the power shut-off mechanism and the sand discharging mechanism. The pipes 20 21 are connected by a pipe 22 with a reservoir H, and valves G G' are operated at the same time that valve A is opened and closed, as a result of which valve A is opened to apply the brakes and at the same time valves G G' are opened for air to flow from reservoir H' through pipes 22, 20 and 21 to the power shut-off mechanism and the sand drum. The sand discharged from the drum F by the admission of compressed air to said drum is adapted to flow through a delivery pipe $f$ so as to discharge the sand upon the track and in front of the driving wheels of the engine as usual. Said valves G G' may be of any suitable construction, but they are shown as rotary valves provided with arms $g$ $g'$, which arms are operatively connected by a link $g^2$, and from the arm $g$ extends a link $g^3$ which is pivoted by a pin $g^4$ to valve operating lever B, whereby the movement of the lever in one direction to open valve A operates the links $g^3$ $g^2$ to turn the valves G G' simultaneously for establishing the flow of air from reservoir H' through pipes 20 21.

Suitable means are provided for the automatic operation of the throttle lever H, the latter being equipped with a hand piece $h$ which controls a latch $h'$ adapted for engagement with the toothed segment $h^2$. On the lever H is pivoted a bellcrank $i$, one arm of which is connected with the hand grip $h$ and to the other arm of this bellcrank there is pivoted a link $i'$ which is connected with the piston rod $i^2$ of a piston I' working in a cylinder I. Said cylinder is supported in a fixed position adjacent to the throttle lever H, one end of the cylinder being open, as shown in Fig. 4, and to this cylinder there is connected the otherwise free end of air pipe 20 so that the flow of air through pipe 20 when valve G is open will establish pressure in the cylinder I and impart movement to piston I', whereupon the piston rod $i^2$ will operate bellcrank $i$ so as to withdraw the latch $h'$ from the toothed segment and thereby impart movement to the throttle lever H for the purpose of operating the throttle valve so as to shut off the supply of steam to the engine cylinders, thus effecting the operation of shutting off the power at the same time that the brakes are applied.

Figures 2, 3, 4:
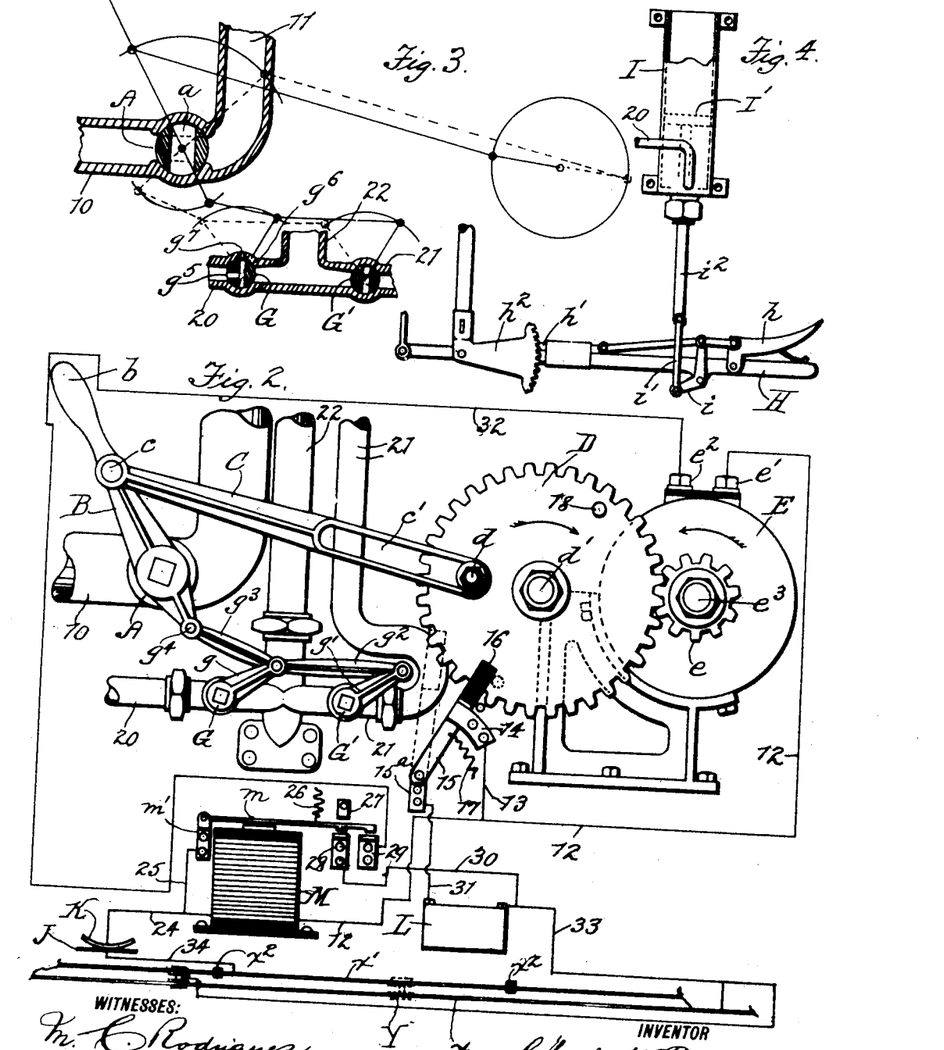
Fig. 2 is a side elevation of a part of the train stop mechanism showing the relation diagrammatically to the track.
Fig. 3 is a sectional view partly in elevation of the valves which are operated by the prime mover.
Fig. 4 is an elevation partly in section of the means for shutting off the engine power.

By reference to Fig. 3 it will be seen that valve G is provided with two ports $g^5$ $g^6$ extending at right angles to each other and when said valve is in the normal closed position for cutting off the flow of air from the reservoir H', the port $g^6$ is in register with a vent port $g^7$, thus venting pipe 20 so that the air will be free to escape from said pipe and from the piston cylinder I.

The track on which the engine is adapted to travel consists of rails, one of which, $x$, is continuous, whereas the other rail $x'$ is insulated at $x^2$ to produce blocks or sections. In addition to the track the train stop mechanism requires the employment of a control rail J positioned adjacent to the track or between the rails thereof as may be found most desirable, said control rail J being of any suitable length, one of said rails being in each block, substantially as disclosed in Figs. 1 and 2 of the drawings, and as disclosed in an application for automatic railway signals filed on even date herewith by myself and one Leach. The engine is equipped with a contact shoe K, which is in circuit with a magnet M, a battery L and a motor E. From said shoe K a conductor leads to magnet M, to which magnet is connected the conductor 12 of the motor circuit. The armature $m$ of the magnet is pivoted to a bracket $m'$ from which leads a conductor 25 branched onto conductor 24. Said armature $m$ is under the control of a spring 26 so that the armature is normally in contact with a stop 27, but the free end of the armature is in operative relation to the contacts 28 29. From the contact 28 extends a conductor 30 which is connected to the negative pole of battery L, and from the positive pole of this battery extends a conductor 31 which is attached to a bracket $15^a$ on which is hung the movable member of the breaker switch 15. From the binding post $e^2$ of motor E a conductor 32 leads to one contact 29, and when the armature of magnet M is closed so as to make contacts 28, 29 the motor circuit is complete so that current will be supplied to motor E from battery L without flowing through magnet M, the motor circuit being as follows:— from the positive pole of battery L the current flows through conductor 31, bracket $15^a$, breaker switch 15, its contact 14, conductor 12 to binding post $e$ of the motor, thence through binding post $e^2$, conductor 32, contact 29, through armature lever $m$, into contact 28, and thence by conductor 30 back to the negative pole of the battery, the current flowing around the magnet M so as to energize the motor without exposing the magnet winding to the destructive effect of the heavy current required to operate said motor.

Figure 1:
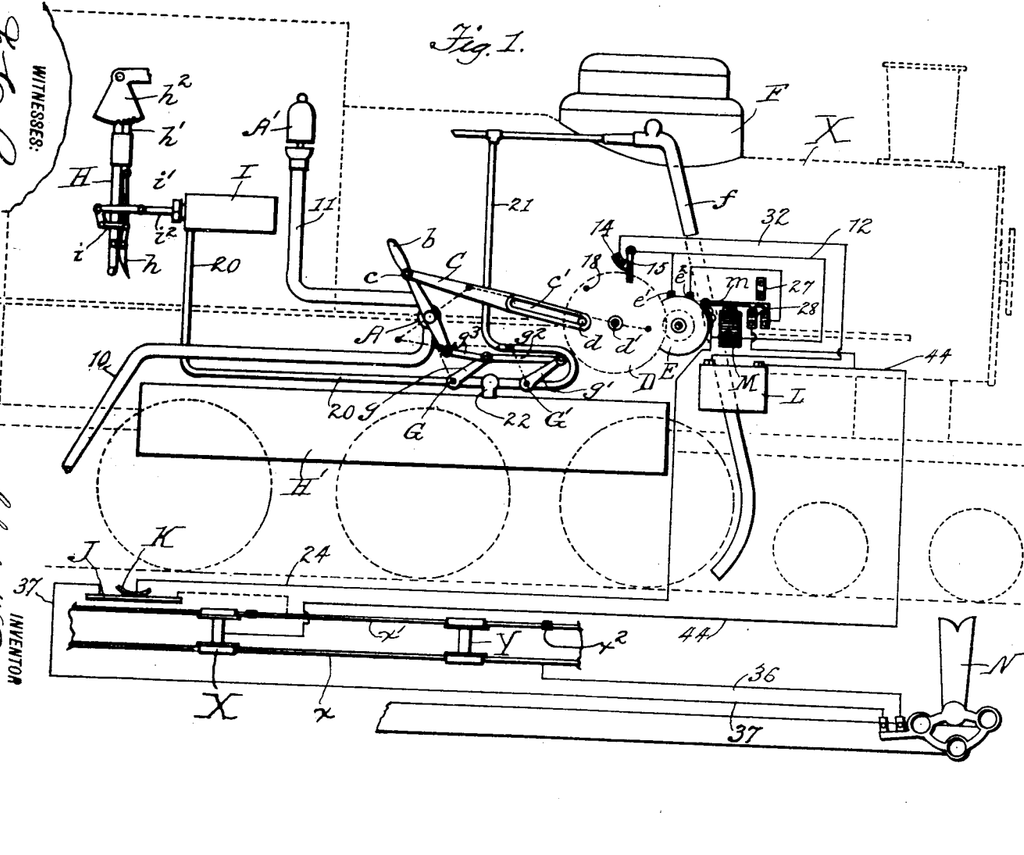
Figure 1 is a diagrammatic view illustrating the application of my train stop mechanism to an ordinary locomotive, the latter being indicated in dotted lines, and the relation of the engine to the track and the semaphore being illustrated with a view to showing the means for operating the train stop mechanism either from the semaphore or from a second vehicle at rest or in motion within a preceding block.

From the negative pole of the battery L extends a conductor 33 which is connected with the continuous rail $x$ of the track, and from the contact rail J extends a conductor 34 which is attached to one section $x'$ of the interrupted track rail. Now when the vehicle X is in a block in the rear of another block which is occupied by a second vehicle Y, as shown in Figs. 1 and 2, then the vehicle X in the rear block cannot pass along the track and into the block occupied by the vehicle Y, for the reason that the train mechanism will be operated automatically to apply the brakes. The initial step in the automatic operation of the train stop mechanism consists in energizing the magnet M so as to attract the armature for closing the motor circuit, and this initial energization of said magnet M is effected by a circuit which is closed through the track rail and the two vehicles X Y, the circuit being as follows: With the vehicle Y in the block ahead, and X in the block in rear so that the shoe K of vehicle X is in contact with the control rail J, the magnet circuit may be traced as follows: from the positive pole of battery L, through conductor 31, breaker switch 15, conductor 13, a part of conductor 12 to the winding of magnet M, conductor 24, contact shoe K, rail J, conductor 34, the insulated section $x'$ of the track, the wheels and axle of vehicle Y, continuous rail $x$ and conductor 33 to the negative pole of the battery. The magnet M being energized by the flow of current through the same, armature $m$ is attracted against the tension of spring 26 so that the armature will make contacts 28 29 and close the motor circuit as hereinbefore described, but to keep the motor circuit closed it is necessary that current shall flow through the magnet M so that it will continue to hold the armature $m$ against said contact 28, this continued flow of current taking the following path: from the positive pole of battery L, through conductor 31, breaker switch 15, conductor 13, a part of conductor 12, the magnet winding, branch conductor 25, armature $m$, contact 28, and through conductor 30 back to the negative pole of the battery. Now when the motor is energized the current flows in one path so as to supply the heavy current necessary for the operation of the motor and in another path so as to continue to energize the magnet, but the current for the operation of the motor will not flow through the magnet, thus relieving the latter from the destructive effect of the motor current. When the motor is rotated as described, gear $e$ is rotated in the direction of the arrow of Fig. 2, and it operates to impart rotary motion to member D, the wrist pin $d$ of which will impart movement in one direction to link C, whereupon the lever B will be drawn toward the right, and links $g^2$ $g^3$ will be moved toward the left, as a result of which the valves A G G' will be opened in order to vent the train line 10 and permit air to flow into cylinder I and into the sand drum for the purpose of applying the brakes, shutting off the power, and discharging the sand automatically, the air escaping from the train line operating the whistle A'. The turn of member D in the direction of the arrow of Fig. 2 brings the stud 18 into contact with the breaker switch 15 so as to shift the latter over to the dotted line position and away from contact 14, thereby interrupting the motor circuit so as to discontinue the flow of current to motor E and at the same time interrupt the magnet circuit so as to deënergize magnet M. Obviously, the train is brought automatically to a stop by the operation of mechanism herein described, and this operation is entirely automatic owing to the fact that the preceding block is occupied by a vehicle Y which closes a circuit through rail $x$ to the rear vehicle X.

Figure 5:
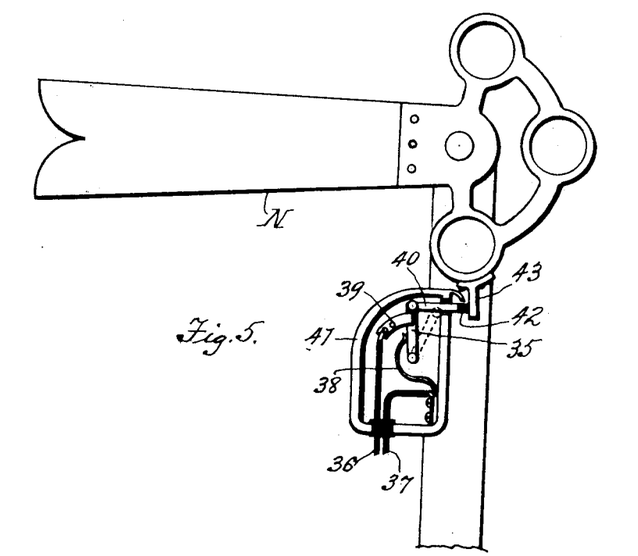
Fig. 5 is an elevation illustrating the relation of the switch to the moving part of a semaphore.

As heretofore described, the train stop on one vehicle occupying a block of the track is controllable automatically by the presence of another vehicle occupying a block of the same track a suitable distance ahead, but a further feature of the invention consists in operating the train stop when a track semaphore is displayed at danger. The semaphore N controls a breaker switch 35 operating to close a circuit which includes conductors 36, 37, the former being connected to the continuous track rail, whereas the latter is attached to control rail J. One form of the breaker switch is illustrated more particularly in Fig. 5, wherein the breaker switch is illustrated as a pivoted arm which is normally pressed to a position to open the circuit by a spring 38, said pivoted arm being adapted to make contact 39 in electrical connection with conductor 36. The breaker switch is shown as having a stem 40 which passes through the switch inclosing case 41, the free end of said stem 40 having an insulation 42 which is adapted for engagement by a toe-piece 43 on the semaphore N. When the semaphore is displayed at safety, spring 38 acts on the breaker switch to move it into the dotted line position of Fig. 5, thus interrupting the circuit beween contact 39 and the spring; but the movement of the semaphore into the danger position of Fig. 5 brings toe-piece 43 into contact with stem 40, thus shifting the breaker switch 35 into the full line position of Fig. 5, so that the breaker switch will make contact 39 and close the semaphore circuit through conductors 36 37. When the shoe K on the vehicle X rides upon contact rail J the semaphore circuit for energizing the magnet M will be closed as follows: from the positive pole of battery L, through conductor 31, breaker switch 15, contact 14, conductors 13, 12, to magnet M, conductor 24, shoe K, rail J as partly shown in Fig. 2, and as then shown in Figs. 1 and 6, the circuit is from said rail J, through conductor 37, spring 38, breaker switch 35, contact 39, conductor 36, continuous rail $x$, the wheel, axle and frame of vehicle X, and thence through a conductor 44 to the negative pole of the battery. The magnet M is thus energized for the purpose of attracting the armature $m$ and closing the motor circuit in the manner heretofore described for the purpose of operating the train stop mechanism when the semaphore is displayed at danger.

Figure 6:
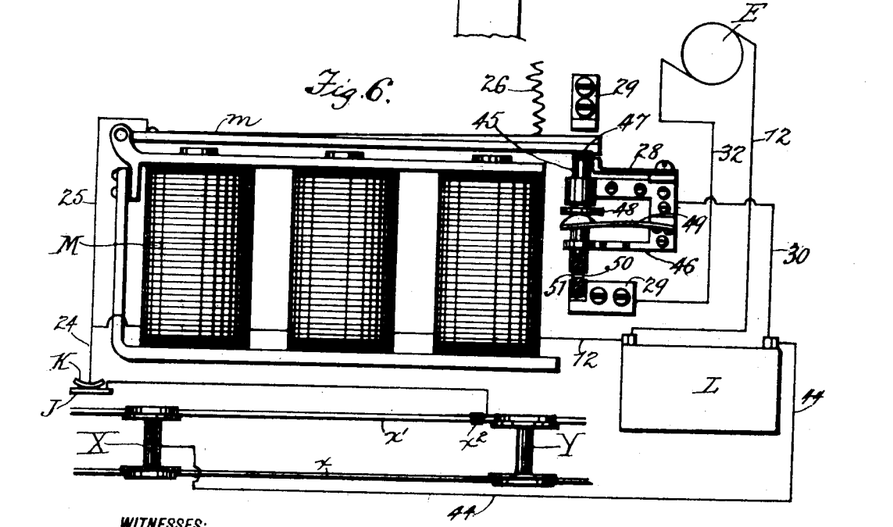
Fig. 6 is an elevation partly diagrammatic of a preferred form of the circuit closing mechanism whereby the motor circuit is supplied with current from a suitable source of energy independently of the current flowing through the controlling magnet.

In Fig. 6 of the drawings there is disclosed a constructional form of the magnet M and the means through which the heavy motor current may flow without subjecting the magnet M to the destructive effect of the current required to operate the motor. The magnet M is shown as consisting of a series of three coils adapted to attract the armature $m$, the latter being under mechanical control of a spring 26, as heretofore described, said magnet being connected with the positive pole of the battery by the conductor 12 and with the shoe K by conductor 24, a branch conductor 25 being employed between conductor 24 and armature $m$. The spring 26 retains the free end of the armature normally against the stop 29, but when the armature is attracted by the magnet its free end makes contact 28 so that the motor circuit E will be closed for the current from the battery L to flow through conductor 12, the motor, the return conductor 32, and when a switch mechanism presently described is closed the current returns through conductor 30, to the negative pole of the battery. The switch mechanism just referred to embodies a slidable stem 45 supported in a suitable yoke-shaped frame. This stem is provided at one end with an insulation 47 in the path of armature $m$ so that the movement of armature $m$ will bring it into contact with stem 45, but said armature is insulated electrically from the stem. Said stem is provided with a collar 48 with which engages a leaf spring 49, the latter acting to impel the stem normally for its insulation 47 to engage mechanically with armature $m$. At the other end of the sliding stem is a carbon contact 50 adapted to make electrical contact with another carbon contact 51 held in a socket of the plate forming the electrical contact 29. When the armature $m$ is energized either by the movement of the semaphore to danger or by the presence of a vehicle Y in the block ahead of the vehicle X so that armature m is attracted, all as hereinbefore described, the motor circuit is closed by carbon contact 50 coming into electrical engagement with contact 51 so as to permit the current to flow from battery L into the motor E without passing through magnet M.

Figure 7:
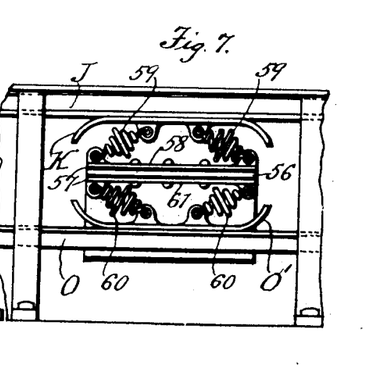
Fig. 7 is a side elevation of one form of a pick-up shoe adapted for coöperation with different rails.
Figure 8:
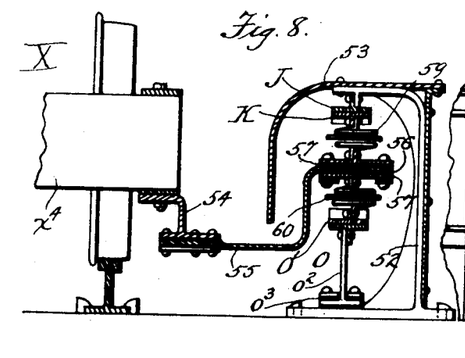
Fig. 8 is a cross section through the shoe.
Figure 9:
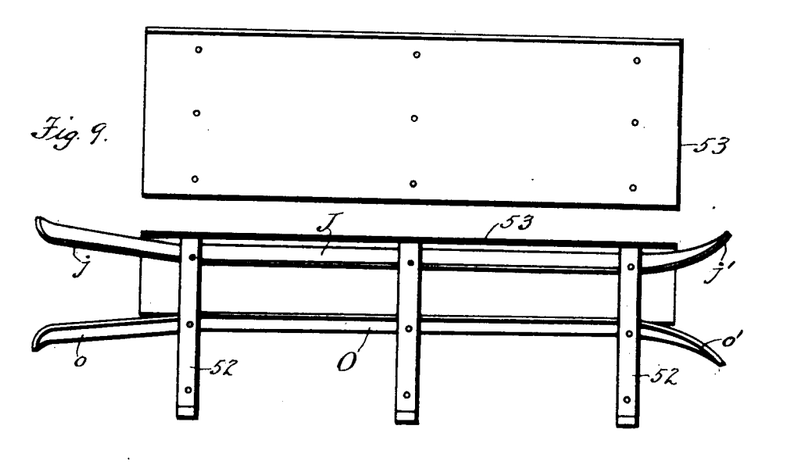
Fig. 9 is an elevation showing the contact rails, the shoe being omitted.

A constructional form of the contact rail J, and train shoe K for engagement therewith, is shown in Figs. 7, 8 and 9 of the drawings, said figures illustrating, also, the arrangement of a signal contact shoe and a signal contact rail in conjunction with the danger signal shoe K and rail J, whereby a compact construction is secured.

A plurality of brackets 52 are secured to the ties of the track at the place where rails J O are to be installed, and these brackets support a hood 53 adapted to protect the rails J O from sleet and snow. As shown, the rail J is positioned in the upper part of the casing, the respective end portions of said rail being inclined, as at $j\ j'$, in order that the shoe may readily engage with and disengage itself from the rail. The rail is secured to and insulated from the brackets 52 by suitable means. The other rail O is adapted to be used in connection with a signal mechanism disclosed in the joint application of Leach and myself to which reference has heretofore been made, and this rail O is positioned within the casing at a suitable distance below and parallel to the rail J. Said signal rail O is inclined at its end portions, as at $o\ o'$, similar to the end portions of the rail J, see Fig. 9, and said rail is supported in a fixed position by short posts $o^2$ insulated at $o^3$. A part of the vehicle X, such as the brake beam $x^4$, is equipped with an insulated hanger 54, one member 55 of which hanger is bent upwardly so as to terminate in an arm 56. Against the upper and lower faces of this arm are applied insulations 57 and to the upper insulation there is secured a carrying plate 58 to which are attached the springs 59 which support the shoe K and operate to press said shoe into the desired frictional and electrical contact with rail J. A similar shoe O' is supported by springs 60 from a carrying plate 61 secured to the insulation 57 on the under side of the hanger arm 56. It will be seen that the hanger 54 55 supports two spring-pressed shoes K O', respectively adapted for contact with the rails J O, said rail J forming a part of a train stop circuit, whereas the rail O is adapted to close a signal circuit in a manner disclosed in the joint application to which reference has been made.

Figure 10:
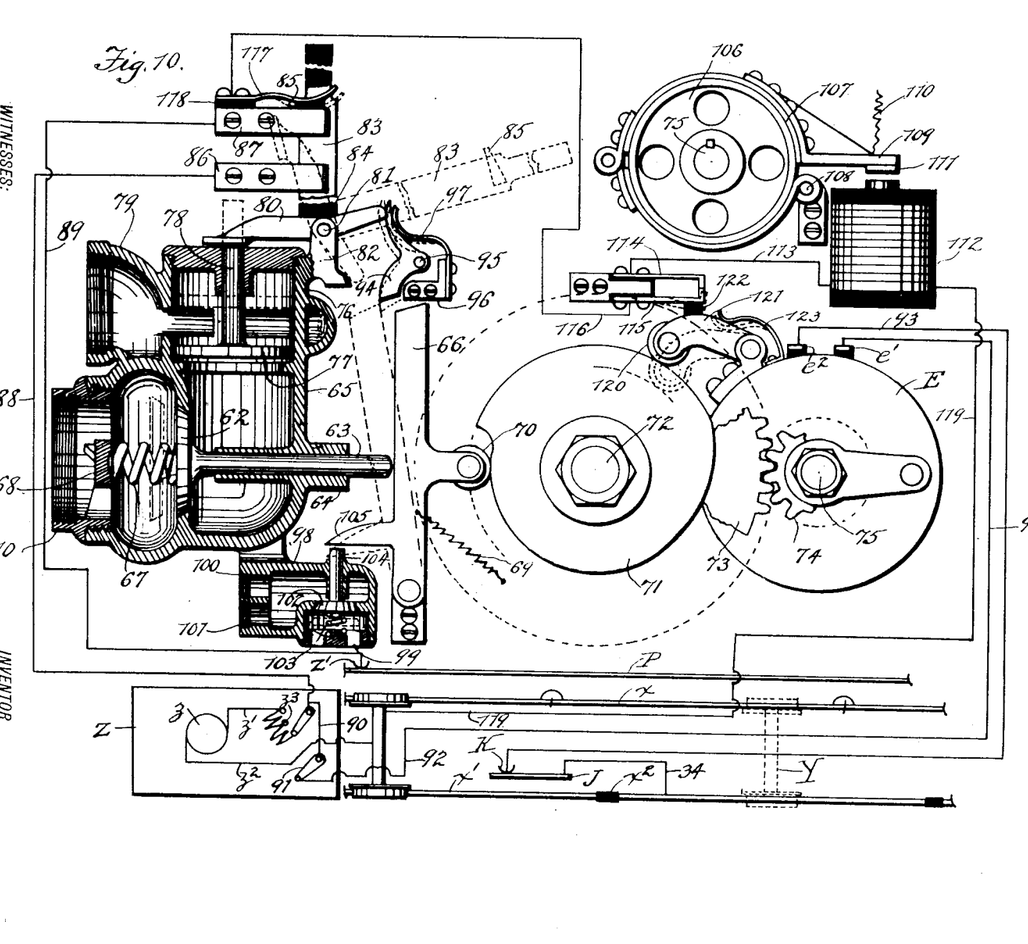
Fig. 10 is a view partly in vertical section and partly in side elevation of the train stop mechanism when used in conjunction with an electric railway.

In Fig. 10 of the drawings I have illustrated another embodiment of the train stop mechanism adapted for use in conjunction with an electrically propelled vehicle Z, the power for the propulsion of which is derived from a current carrying rail P, such as the third rail of an electric railway. The track upon which the vehicle Z is adapted to run consists as heretofore described of a bonded continuous rail $x$, the other track rail consisting of sections $x'$ insulated at $x^2$ to produce the blocks or sections. Vehicle Z is propelled by motor $z$ indicated diagrammatically, said motor being in a circuit formed by conductors $z'\ z^2$ to which current is supplied through a controller $z^3$ and from a contact shoe Z' adapted to ride upon the power rail P. Vehicle Z is equipped with the train stop mechanism, the train line pipe of which is indicated at 10. As shown this train line pipe is normally closed by a valve 62, the stem 63 of which passes through a guide boss 64 of a valve casing 65 so that the stem is normally in the path of a lever 66. The valve 62 is held against its seat by a coiled spring 67 seated against a fixed part 68 within the valve casing. The valve operating lever 66 is normally held away from contact with the stem 63 by a spring 69, and said valve lever is provided intermediate its end with a shoe or roller 70, the latter being in the path of a rotary cam 71, on a shaft or arbor 72, said shaft or arbor having a gear 73, which is in mesh with a gear pinion 74, on the armature shaft 75 of a motor E, the latter being shown as having binding posts $e'\ e^2$.

The valve casing 65 is provided with an upstanding member 76 within which is a piston valve 77, the stem 78 of which passes through said upstanding member 76, the latter being provided, also, with a branch connection 79 to which is adapted to be coupled the pipe 21 which leads to a whistle or other audible signal, whereby upon the opening of valve 62 the flow of air from the train line pipe 10 will act to lift the piston valve 77 so that the air will flow through the branch connection 79 and into pipe 21 for the operation of the audible signal. The stem 78 of piston valve 77 operates to impart movement to an angle lever 80, the latter being positioned above the upstanding member 76 of the valve casing 65. This angle lever is fixedly secured intermediate its ends to a horizontal rock shaft 81, the latter being supported in suitable bearings one of which is indicated at 82, said rock shaft serving as a fulcrum for the angle lever 80 and for a breaker switch 83. The breaker switch is insulated at 84 from electrical connection with rock shaft 81 and near its free end said breaker switch 83 is provided with an insulated member 85. The breaker switch is adapted to span the gap between electrical contacts 86 87, the former being connected by a conductor 88 with the controller $z^3$ (see Fig. 10) of vehicle Z, whereas the other contact 87 is connected by a conductor 89 with a contact shoe Z' of said vehicle Z. It is apparent that the current will flow from power rail P through contact shoe Z', conductor 89, contact 87, breaker switch 83, contact 86, conductor 88, controller $z^3$, the motor circuit including the motor $z$, and thence to the wheels and axle of the vehicle Z to the rail $x$ by which the circuit is completed to the generator at the power station, the two mains or feeders from the generator at the power station to the vehicle being formed by the power rail P and the continuous return rail $x$, whereby current will be supplied to the motor for the propulsion of the vehicle when the breaker switch 83 is in the closed position spanning the contacts 86 87. It is apparent, furthermore, that the elevation of piston valve 77 due to the escape of air from the train line when the brakes are applied will raise stem 78 and turn angle lever 80 so as to impart rocking movement to the breaker switch 83, thus withdrawing said breaker switch from contacts 86 87, the breaker switch moving to the dotted line position shown so as to interrupt the circuit to motor $z$ and shut off the power to vehicle Z simultaneously with the application of the brakes.

The motor E of the train stop mechanism is intended to be supplied with current from power rail P and through controller $z^3$, for which purpose a conductor 90 is branched onto the conductor 88 leading to the controller. This conductor 90 is connected with a switch 91 from which extends a conductor 92 leading to the binding post $e'$ of the motor and from the other binding post $e^2$ of said motor leads a conductor 93 and is attached to a contact shoe K, the latter being adapted as heretofore described to ride upon contact rail J which is connected by the conductor 34 with a section $x'$ of the interrupted track rail, thus completing the circuit through motor E when the train stop mechanism is controlled by a vehicle Y in the block ahead of the block occupied by vehicle Z. The rotation of the armature forming a part of motor E drives pinion 74 which in turn imparts rotary motion to gear 73, shaft 72, and cam 71, whereby said cam acts on the shoe 70 to press the lever 66 into the dotted line position so that the lever acts on the valve stem 63 to force the valve 62 into an open position shown in dotted lines as a result of which air escapes from the train line 10 for applying the brakes. When the lever 66 is moved over to the position for operating the valve and the piston valve 77 is lifted, a dog 94 is pressed into the path of said lever 66 for holding the same in the dotted line position. This dog is pivoted at 95 on a fixed bracket 96, and the dog is of angular form so that one end thereof is normally engaged with an end portion of angle lever 80, whereas the other end portion of the dog is adapted to be interposed in the path of lever 66 for the purpose of locking said lever in a position wherein its roller 70 is out of the path of the cam 71. It will be noted that dog 94 is operated by lever 80, the movement of which depends upon the elevation of piston valve 77 and, accordingly, the dog 94 will not be moved into the path of lever 66 until said lever is pressed to the dotted line position by the cam so as to open the valve to the train line 10, the action of the dog 94 being subsequent to the operation of the lever 66. As shown, the dog 94 is controlled by a spring 97 so that one end of the dog is normally engaged with an end portion of angle lever 80.

Attached to the valve casing 65 is another valve casing 98, the same being herein shown as having a branch 99 to which may be attached the pipe 22 leading from a compressed air reservoir, such as H', said valve casing 98 being shown as having branch connections 100 and 101, to which connection 100 is adapted to be attached a pipe 21 for supplying air to the sand receptacle, such as F in Fig. 1, whereas the connection 101 may, when the mechanism of the character described is applied to a steam locomotive have a pipe 20 attached thereto for the purpose of operating the throttle lever which controls the power of the steam engine. With a pipe 22 coupled to branch 99 of the valve casing 98 and with a pipe 21 attached to the branch 100 of said valve casing 98, it is evident that air may flow from the reservoir, such as H' in Fig. 1, to a sand drum F, the throttle connection 101 being closed by a plug or cap. The flow of air from the reservoir to the sand receptacle, however, is controlled by a valve 102 operating within said casing 98, said valve being held to its closed position by a spring 103 and having a stem 104 which is positioned in the path of a toe-piece 105 on valve lever 66. In the normal position of lever 66 the toe-piece 105 is free from valve stem 104, but the movement of lever 66 to the position for opening the valve 62 brings the toe-piece 105 into contact with stem 104 and opens the valve 103, so that air will flow from the reservoir through valve casing 98 and to the sand receptacle for the purpose of discharging sand upon the track at the time the brakes are applied to the vehicle.

When the motor E is energized for the operation of the valve which controls the train stop mechanism, said motor acquires a certain momentum which it is desired to arrest in order that the cam 71 may be brought to a stop at a desired point, and to secure this desired stoppage of the motor I employ a brake mechanism which is electrically controlled in an automatic manner, said brake mechanism being illustrated diagrammatically in Fig. 10, wherein 75 designates the armature shaft of said motor. On this armature shaft is rigidly secured a brake disk 106, the latter being adapted for engagement by a brake band 107. One end of the brake band is anchored to a bracket 108 and to the other end of the brake band is attached an arm 109, the latter being under the mechanical control of a spring 110. This brake band arm carries an armature 111 positioned in the field of a magnet 112. From the magnet extends a conductor 113 leading to a spring contact 114, the latter coöperating with a similar spring contact 115 from which latter contact a conductor 116 extends to a switch 117. The spring switch 117 is insulated at 118 from contact 87 upon which the spring switch is mounted, and this spring switch is normally retained out of electrical engagement with contact 87 by the insulated member 85 on the breaker switch 83, said insulated member 85 in the closed position of the breaker switch 83 being interposed between contact 87 and spring switch 117. The magnet 112 is in circuit with the wheel and axle of vehicle Z by conductor 119. Normally the contacts 114, 115 are separated owing to the spring action thereof, but when motor E is rotating so as to turn cam 71 for the operation of brake lever 66 as described, then said cam 71 acts on a roller 120 of a pivoted arm 121, the latter being positioned close to contact 115 and insulated from electrical contact therewith by insulation 122, said pivoted arm 121 being held by a spring 123 in a position wherein roller 120 is normally in contact with said cam 71. Subsequent to the operation of motor E for opening the train line so that valve 77 will interrupt the circuit to the motor $z$ by throwing out the breaker switch 83 to the dotted line position of Fig. 10, the spring switch 117 makes electrical connection with contact 87 owing to the withdrawal of insulating member 85 from position between 87 and 117. Accordingly, the circuit to magnet 112 is closed so as to apply the brake band 107 to brake disk 106 for the purpose of arresting the continued rotation of motor E, said magnet circuit being as follows:—from shoe Z' in contact with rail P, through conductor 89, contact 87, spring switch 117, conductor 116, contact 115, 114 (arm 121 being raised by cam 71 so as to close the space between said contacts 115, 114) conductor 113, magnet 112, conductor 119, the wheel and axle of vehicle Z to rail $x$. The application of the brake band 107 stops the motor so as to bring the cam 71 to a desired position, after which the valve lever 66 should be reset by hand in order to restore the train stop mechanism in condition for continued operation.

Having thus fully described the invention, what I claim as new, and desire to secure by Letters Patent is:

1. In an automatic train stop, the combination with a valve on a moving vehicle, of a motor connected for operating said valve, a source of energy for operating said motor, a controller in a shunt around a normally open electric circuit which includes the motor and said source of energy, contact means in circuit with said controller, and motor-arresting means operable subsequently to the operation of said valve, said contact means being dependent for its operation upon the condition of the track relatively to the moving vehicle whereby a local track circuit is completed through the controller and current from the source of energy is supplied to the motor without flowing through said controller.

2. In an automatic train stop, the combination with a valve carried by a moving vehicle, of a motor also carried by the vehicle and connected for operating said valve, a source of energy in a normally open electric circuit which includes said motor, an electro-magnetic controller in a shunt around said circuit, a contact shoe in circuit with said controller, and motor-arresting means operable subsequently to the operation of said valve, said contact shoe and the controller being dependent for their operation upon the condition of a track section or block ahead of the block occupied by the moving vehicle so that the motor circuit and motor will be energized by current from the source of energy, said current flowing in a path excluding the electro-magnetic controller.

3. In an automatic train stop, the combination with a valve carried by a moving vehicle, of a motor connected for operating said valve, a source of energy in a normally open electric circuit including the motor, a circuit breaker in said circuit, means operated by the motor and coöperating with the circuit breaker to interrupt said motor circuit subsequent to the operation of said valve by said motor, a controller in a shunt around the motor circuit, contact means in a local circuit with said controller, and means for arresting the motion of the motor due to the acquired momentum, said last-named means being operable subsequently to the operation of the valve.

4. In an automatic train stop, the combination with a normally open electric circuit, and a valve carried by a moving vehicle, of a motor connected for operating said valve, a source of energy for said motor, means operated by said motor subsequently to the operation of the valve for interrupting the influence of the source of energy upon the motor, means for arresting the motion of the motor due to the acquired momentum, said motor-arresting means being operable subsequently to the operation of the brake valve, and a controller dependent for its operation upon the condition of the track for setting into action the motor.

5. In an automatic train stop, the combination with a valve carried by a moving vehicle, of a motor, a motor-driven element having means for operating said valve, a source of energy included in a normally open electric circuit with the motor, a breaker switch in the motor circuit, means operated by the motor driven element subsequently to the operation of said valve for shifting the breaker switch to interrupt motor circuit, means for arresting the motion of the motor due to the acquired momentum, said motor-arresting means being operable subsequently to the operation of the brake valve, and a controller dependent for its operation upon the condition of the track for setting into action said motor.

6. In an automatic train stop, the combination of a motor carried by a moving vehicle, a source of energy included in a normally open electric circuit with said motor, a brake valve, a plurality of other valves, a source of air supply independent of the source of energy for the motor and connected with said other valves, a pneumatic power shut-off device connected with one of said other valves, a sand-discharging means connected with another of said valves, means for arresting the motion of the motor due to the acquired momentum, said motor-arresting means being operable subsequently to the operation of the brake valve, and means operated by the motor driven element for the actuation of the brake valve and the actuation also of said other valves to establish the flow of air from the source of air supply to the power shut-off device and the sand-discharging means.

7. In an automatic stop mechanism, the combination with a brake valve, of a motor-circuit including a motor and a source of energy, track-controlled means for closing said motor circuit, means operated by the motor for actuating the brake valve, circuit interrupting means actuated by the motor-operated means subsequent to the actuation of the brake valve, and means for arresting the motion of the motor due to the acquired momentum, said motor arresting means being operable subsequent to the operation of the brake valve.

8. In an automatic stop mechanism, the combination with a brake valve, of a normally open motor-circuit including a motor and a source of energy, track-controlled means for closing said motor-circuit, means controlled by the motor for actuating the brake valve, circuit interrupting means operated by the motor-operated means subsequent to the actuation of the brake valve, and means for arresting the motion of the motor due to the acquired momentum, said motor arresting means being operable subsequent to the operation of the brake valve.

In testimony whereof I have signed my name to this specification in the presence of two subscribing witnesses.

CHARLES W. BREWSTER.

Witnesses:
H. I. BERNHARD,
M. C. RODRIGUEZ.

Copies of this patent may be obtained for five cents each, by addressing the "Commissioner of Patents, Washington, D. C."